US005181813A

United States Patent [19]

McCracken

[11] Patent Number: 5,181,813

[45] Date of Patent: * Jan. 26, 1993

[54] SPLIT RING LEVER CLAMPING ARRANGEMENT

[75] Inventor: Robert E. McCracken, Easley, S.C.

[73] Assignee: Ryobi Motor Products Corp., Easley, S.C.

[ * ] Notice: The portion of the term of this patent subsequent to Dec. 24, 2008 has been disclaimed.

[21] Appl. No.: 792,653

[22] Filed: Nov. 15, 1991

[51] Int. Cl.[5] .......... B23C 1/20

[52] U.S. Cl. .......... 409/182; 24/516; 144/134 D; 144/136 C; 403/344

[58] Field of Search .......... 409/175, 178, 181, 182, 409/209, 210, 214; 144/134 D, 136 C; 24/516, 569; 403/344

[56] References Cited

U.S. PATENT DOCUMENTS

| | | | |
|---|---|---|---|
| 131,843 | 10/1872 | Brooks | 411/402 |
| 1,110,011 | 9/1914 | Schneider | 24/516 X |
| 1,899,883 | 2/1933 | Sacrey | 144/136 C |
| 1,929,116 | 10/1933 | Kirton | 411/911 |
| 2,613,704 | 10/1952 | Sacrey | 144/134 D |
| 2,842,173 | 7/1958 | Turner et al. | 144/136 C |
| 2,867,251 | 1/1959 | Moretti et al. | 144/136 C |
| 2,988,119 | 6/1961 | Godfrey et al. | 144/136 C |
| 3,313,198 | 4/1967 | Walton | 411/402 |
| 3,363,510 | 1/1968 | Burrows et al. | 144/136 C |
| 3,443,479 | 5/1969 | Hawley et al. | 409/182 |
| 3,466,973 | 9/1969 | Rees | 409/182 |
| 3,489,191 | 1/1970 | Blevins | 144/134 D |
| 3,935,788 | 2/1976 | Gilmore | 144/134 D |
| 4,051,880 | 10/1977 | Hestily | 144/134 D X |
| 4,108,225 | 8/1978 | Hestily | 144/134 D |
| 4,239,428 | 12/1980 | Berzina | 409/182 |
| 4,469,235 | 9/1984 | Parker | 215/295 |
| 4,490,891 | 1/1985 | Begley et al. | 24/516 |
| 4,497,092 | 2/1985 | Hoshino | 24/516 X |
| 4,647,260 | 3/1987 | O'Hara et al. | 408/241 S |
| 4,679,606 | 7/1987 | Bassett | 409/182 X |
| 4,731,512 | 3/1988 | Barriac | 215/220 |
| 5,074,724 | 12/1991 | McCracken | 409/182 |

FOREIGN PATENT DOCUMENTS

| | | | |
|---|---|---|---|
| 0652142 | 9/1964 | Belgium | 24/516 |

*Primary Examiner*—Z. R. Bilinsky
*Attorney, Agent, or Firm*—Brooks & Kushman

[57] ABSTRACT

A portable electric router having a depth of cut adjustment mechanism including an adjustment ring which engages a screw thread on the motor housing and rotationally engages the router base. The adjustment ring is formed as a split ring with radially directed projections adjacent opposite sides of the split. One of the projections is formed with a camming surface and a clamp lever is provided with a camming surface slidably engaging the projection camming surface. The projection with the camming surface is captured between the other projection and the clamp lever so that rotation of the clamp lever in a first direction forces the projections toward each other to clamp the adjustment ring to the motor housing and the base and rotation of the clamp lever in a second direction allows the projections to separate to release the adjustment ring.

6 Claims, 5 Drawing Sheets

SPLIT RING LEVER CLAMPING ARRANGEMENT

BACKGROUND OF THE INVENTION

This invention relates to a depth of cut adjustment mechanism for a portable electric tool and, more particularly, to an arrangement for clamping a split depth of cut adjustment ring to such tool.

In my earlier U.S. patent application Ser. No. 07/661,619, filed Feb. 28, 1991, the contents of which are hereby incorporated by reference, I disclose a portable electric router having a depth of cut adjustment mechanism including an adjustment ring which engages a screw thread on the motor housing and rotationally engages the router base. The motor housing and the base are prevented from having relative rotation therebetween. The adjustment ring is formed as a split ring with projections adjacent opposite sides of the split, each with a frusto-conical camming surface. A circular clamp knob mounted for threaded rotation on a bolt passing through the projections radially with respect to the router motor housing bears against the camming surfaces so as to squeeze the ring in order to effect a clamping action as the knob is moved inwardly. While this split ring clamping arrangement is effective, it would be desirable to provide such a clamping arrangement which has a quick engagement and a quick release feature. Accordingly, it is an object of this invention to provide an arrangement for releasably securing the adjustment ring to the motor housing and the base so as to maintain the position of the base relative the motor housing, which arrangement allows for a quick engagement and a quick release of the clamping function.

SUMMARY OF THE INVENTION

The foregoing, and additional, objects are attained in accordance with the principles of this invention by providing a clamping arrangement for use in the environment described above which includes first and second radially directed projections formed on the split ring adjacent opposite sides of the split. Each of the projections has a through-bore extending substantially parallel to a tangent to the ring at the split, the through-bores being substantially aligned when the opposed ends of the ring at the split are closely adjacent each other. The first projection has a first camming surface facing away from the second projection and there is provided a clamp member having a second camming surface slidably engaging the first camming surface. A holding means extends through the first and second through-bores and engages the clamp member to hold the first projection between the second projection and the clamp member. As a result, movement of the clamp member in a first direction draws the first and second projections toward each other and movement of the clamp member in a second direction allows the first and second projections to separate.

In accordance with an aspect of this invention, the first camming surface is complemental to a segment of the surface of a first cylinder having a central axis extending substantially radial to the adjustment ring. The clamp member is arranged for rotary motion about a first axis substantially radial to the adjustment ring and the second camming surface includes a segment of the surface of a second cylinder having a central axis parallel to and spaced from the first axis, with the first and second cylinders having substantially equal radii.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
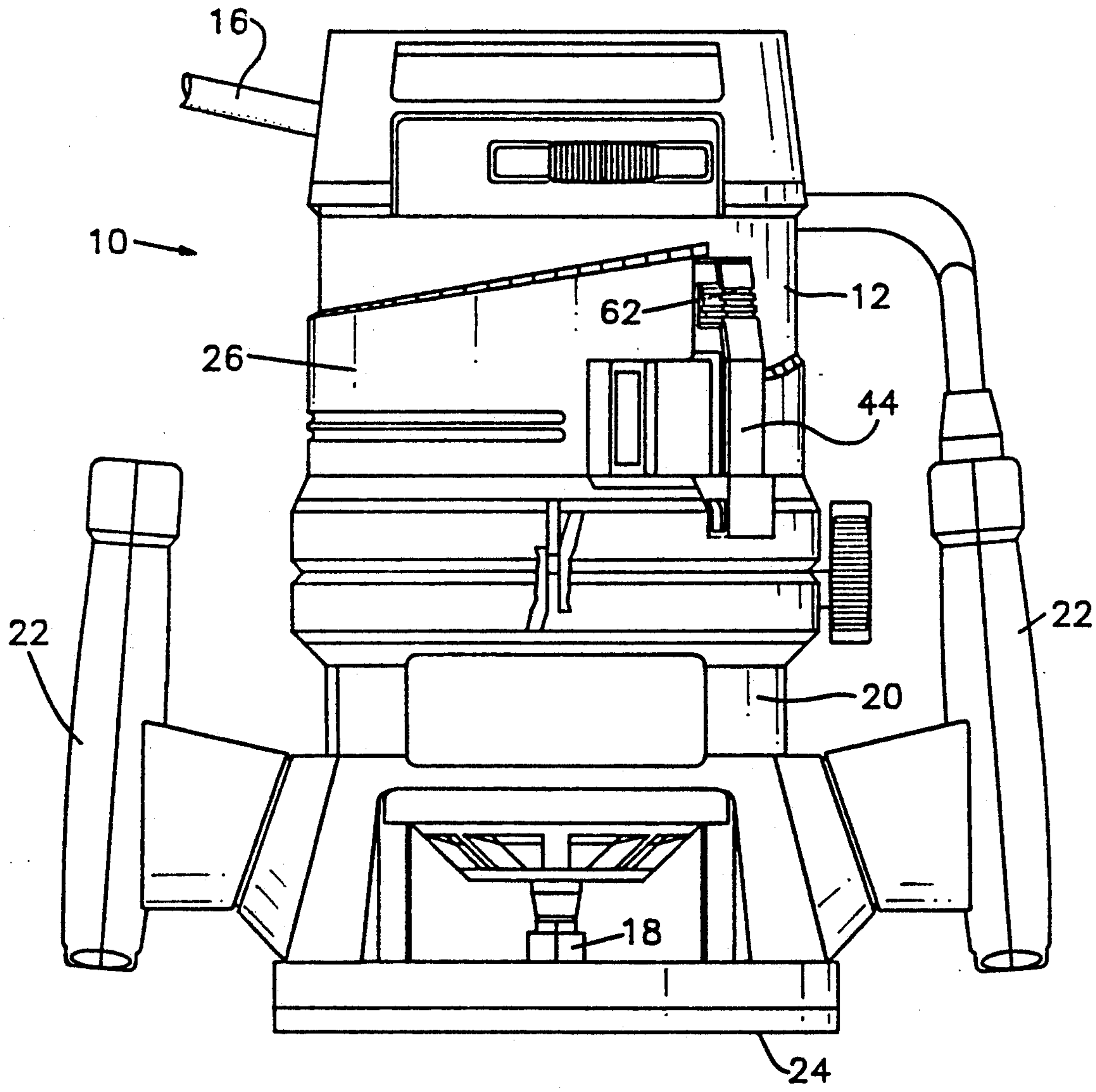
FIG. 1 is an elevational view showing a router constructed in accordance with this invention.
Figure 2:
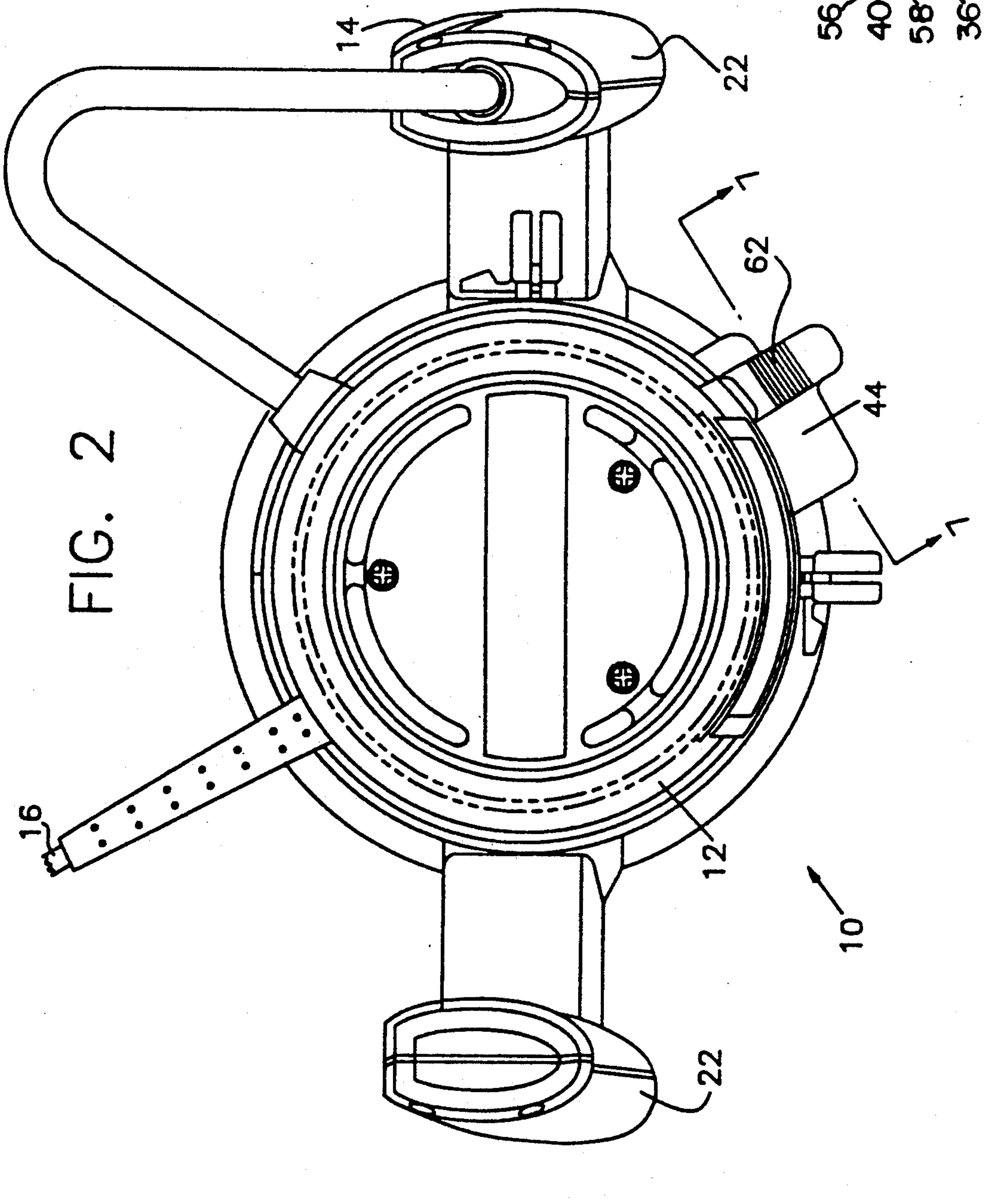
FIG. 2 is a top plan view of the router shown in FIG. 1.

Referring now to the drawings, FIG. 1 illustrates a router, designated generally by the reference numeral 10, which is constructed in accordance with the principles of this invention. The router 10 includes a motor housing 12 which contains a motor (not shown) powered through a switch 14 (FIG. 2) and a line cord 16 and having a rotating output shaft on which is mounted a collet 18 for holding a cutting tool (not shown). The motor, its mounting within the motor housing 12, and the cutting tool collet 18 form no part of the present invention and will not be described in any further detail.

The motor housing 12 is supported in a base 20, as described in the aforereferenced patent application, which includes a pair of handles 22 by means of which an operator can manipulate the router 10 along a work surface. The motor housing 12 is supported in the base 20 so that the cutting tool extends outwardly beyond the lower support surface 24 of the base 20. In operation of the router 10, the lower support surface 24 rests on the upper surface of the work and the distance that the cutting tool extends beyond the lower support surface 24 determines the depth of cut of the router 10. This depth of cut is adjusted by varying the longitudinal position of the motor housing 12 relative to the base 20.

As described in the aforereferenced patent application, the motor housing 12 is generally cylindrical in external configuration. A first longitudinal region of the motor housing 12 has a generally smooth surface, while a second longitudinal region is formed with an external screw thread. The base 20 has a cylindrical bore which is sized to slidably receive therein the smooth longitudinal region of the motor housing 12. In order to prevent relative rotation between the motor housing 12 and the base 20, the cylindrical bore of the base 20 is formed with a longitudinal groove and the motor housing 12 is formed with a projection complemental thereto.

The present invention is concerned with the arrangement for maintaining the depth of cut setting of the router 10. To set the depth of cut, there is provided an adjustment ring 26 which engages the external screw thread on the motor housing 12 and also rotationally engages the base 20. Since the motor housing 12 cannot partake of rotational motion relative to the base 20 because of the longitudinal groove and the projection, rotation of the adjustment ring 26 effects longitudinal displacement of the motor housing 12 relative to the base 20, which varies the distance that the cutting tool projects beyond the lower support surface 24. Subsequent clamping of the adjustment ring 26 to the motor housing 12 and the base 20 maintains the desired depth of cut setting.

Thus, the adjustment ring 26 is formed with an internal screw thread 28 (FIG. 4) which is complemental to the external screw thread of the motor housing 12. The base 20 is formed with an annular groove at its upper end and the adjustment ring 26 is formed with an inwardly directed projection, or flange, 30 which engages the annular groove. Accordingly, rotation of the adjustment ring 26 does not affect its longitudinal position with respect to the base 20 but due to the pitch of the screw thread 28 and its mating screw thread on the motor housing 12, the motor housing 12 is longitudinally displaced relative to the base 20.

Figure 3:
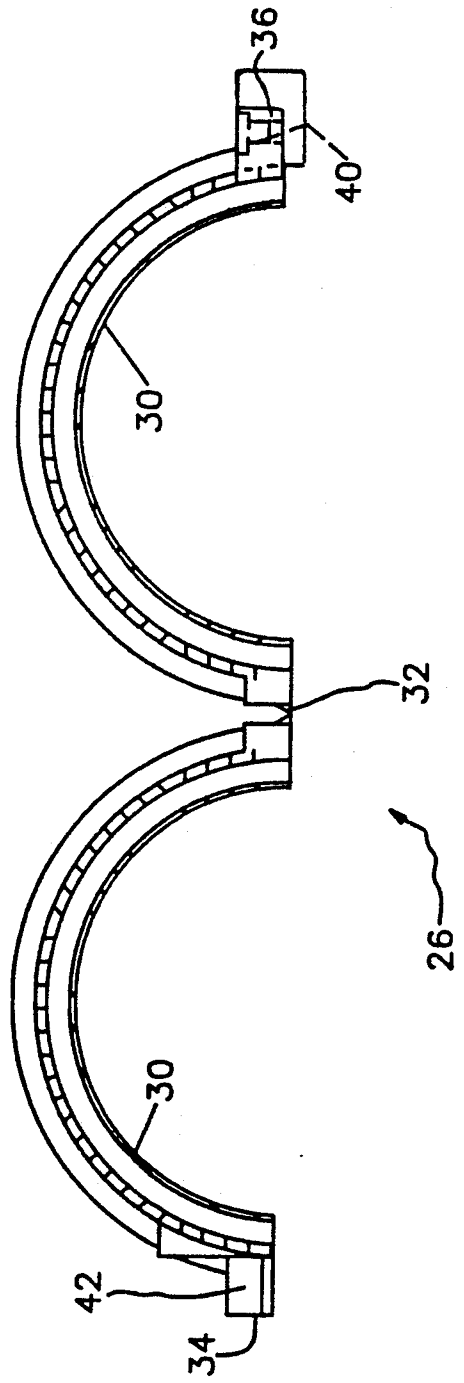
FIG. 3 is a top plan view of the adjustment ring of the router shown in FIG. 1, shown in its fully open state.
Figure 4:
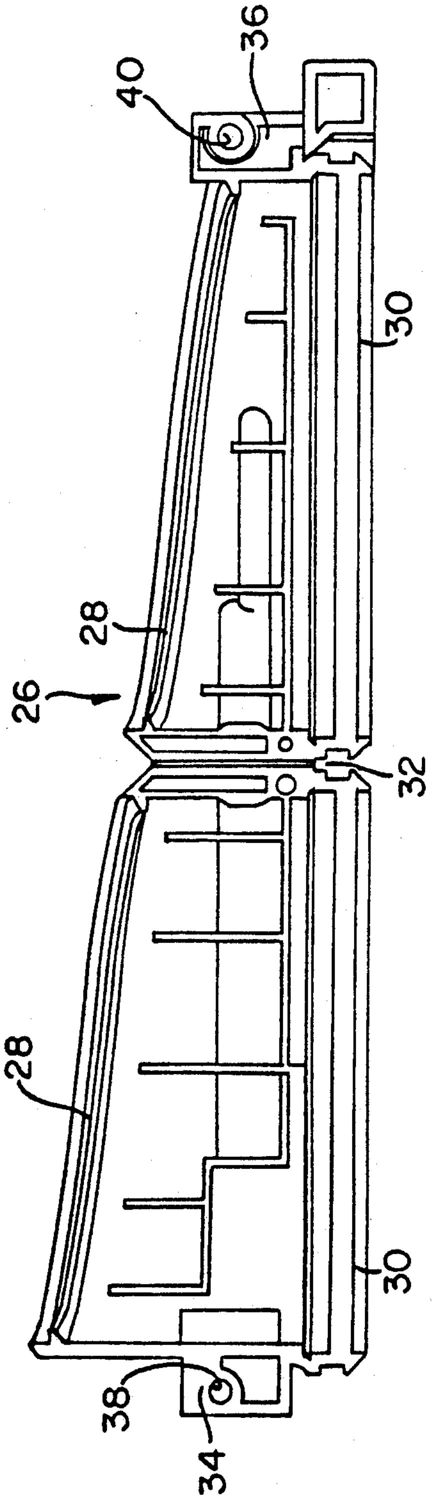
FIG. 4 is an elevational view of the open adjustment ring shown in FIG. 3.
Figure 5B:
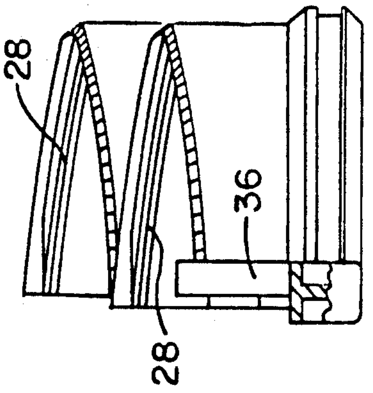
FIG. 5B is a right side view of the open adjustment ring shown in FIG. 4.
Figure 5A:
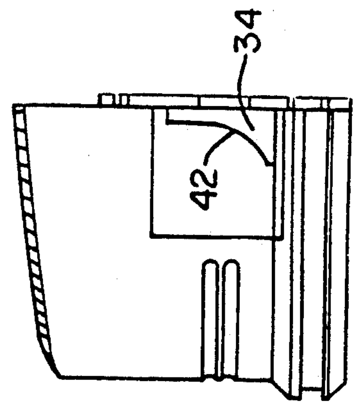
FIG. 5A is a left side view of the open adjustment ring shown in FIG. 4.

Preferably, the adjustment ring 26 is a split ring hinged at 32, as best shown in FIGS. 3 and 4. Each half of the adjustment ring 26 is generally semi-circular in plan. This allows for economical molding of the adjustment ring 26 and easy assembly onto the router 10. The adjustment ring 26 is preferably molded of plastic material so that it is inherently resilient.

After the adjustment ring 26 is rotated by the operator to set the desired depth of cut, the ring 26 must be clamped to the motor housing 12 and the base 20 to maintain that depth of cut setting. Toward that end, the adjustment ring 26 is formed with a first projection 34 adjacent a first of the opposed ends flanking the split of the ring 26 and a second projection 36 adjacent the other opposed end flanking the split of the ring 26. Both the fist and second projections 34, 36, extend substantially radially outwardly from the adjustment ring 26, and are each formed with a through-bore 38, 40, respectively, which extend substantially parallel to a tangent to the adjustment ring 26 at the opposed ends. When the opposed ends of the ring 26 are closely adjacent each other, the through-bores 38, 40 are substantially aligned with each other.

A first camming surface 42 is formed on the first projection 34 facing away from the second projection 36. The first camming surface 42 is shaped complemental to a segment of the surface of a first cylinder having a central axis extending substantially radial to the adjustment ring 26.

Figure 7A:
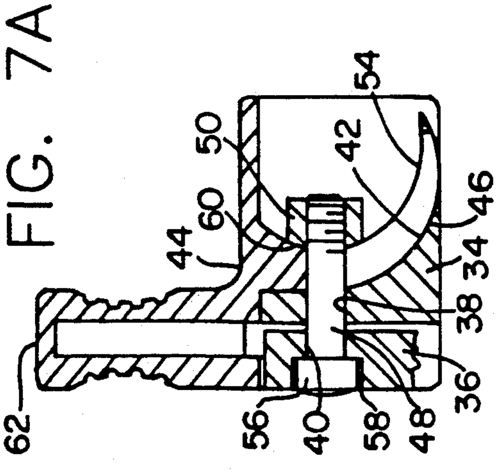
FIG. 7A is a cross sectional view taken along the line 7—7 in FIG. 2 when the adjustment ring is clamped to the motor housing and the base.
Figure 7B:
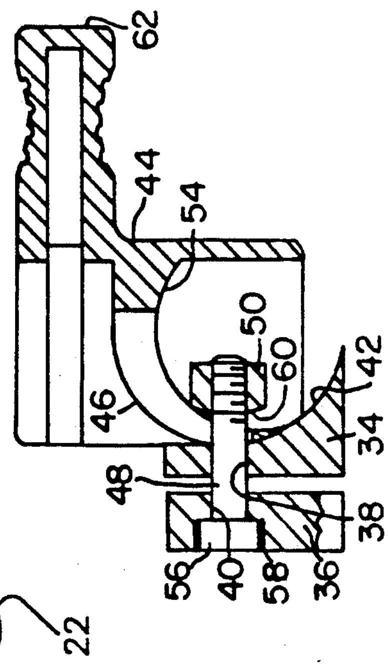
FIG. 7B is a cross sectional view taken along the line 7—7 in FIG. 2 when the adjustment ring is unclamped from the motor housing and the base.

When the first and second projections 34, 36 are pressed together, this secures the adjustment ring 26 to the motor housing 12 and the base 20. To effect such securing, a clamp member 44 is provided. The clamp member 44 has a second camming surface 46 which is adapted to slidably engage the first camming surface 42, as best shown in FIGS. 7A and 7B. The clamp member 44 is arranged for rotary motion about a first axis substantially radial to the adjustment ring 26 and the second camming surface 46 includes a segment of the surface of a second cylinder having a central axis parallel to and spaced from the first axis. The cylinders defining the camming surfaces 42 and 46 have substantially equal radii so that the camming surfaces 42 and 46 are smoothly engaged.

Figure 6C:
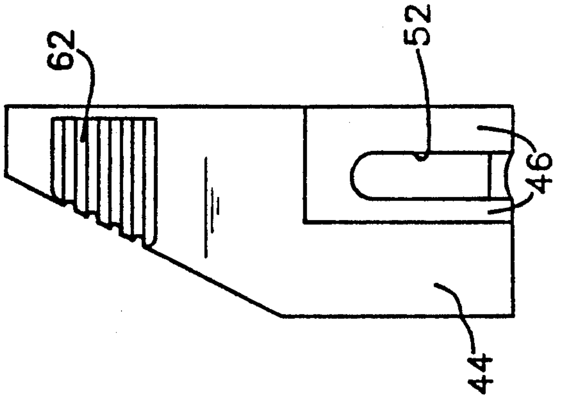
FIG. 6C is a right side view of the clamp member according to this invention.
Figure 6B:
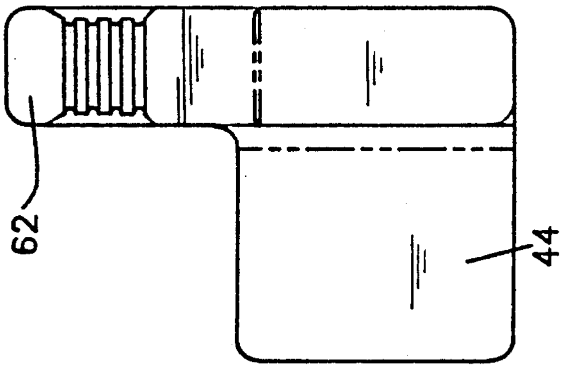
FIG. 6B is a front view of the clamp member according to this invention.
Figure 6A:
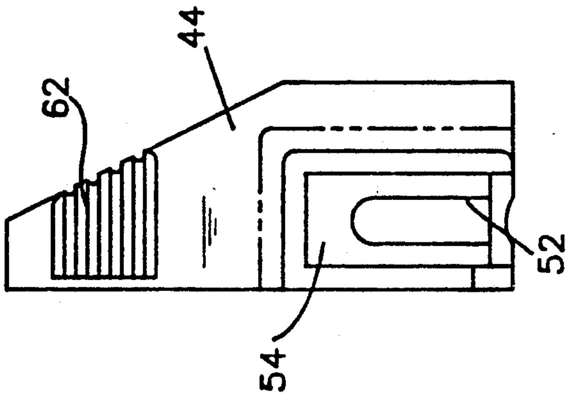
FIG. 6A is a left side view of the clamp member according to this invention.

To secure together the first projection 34, the second projection 36, and the clamp member 44, there is provided a threaded rod, or bolt, 48 along with an associated nut 50. The clamp member 44 is formed with an elongated slot 52 (FIGS. 6A and 6C) through the second camming surface 46 and extending to a third surface 54 behind the second camming surface 46. The third surface 54 is shaped complemental to a segment of the surface of a third cylinder having a central axis co-linear with the first axis about which the clamp member 44 is arranged for rotary motion. The bolt 48 extends through the through-bore 40, the through-bore 38 and the elongated slot 52 and has a bolt head 56 with a dimension larger than the through-bore 40 so that it cannot pass through the through-bore 40. Preferably, the second projection 36 is formed with a counter-bore 58 co-linear with the through-bore 40 and sized to contain the bolt head 56 therein. The nut 50 is dimensioned so that it cannot pass through the elongated slot 52 and is formed with a surface 60 which is a segment of the above-defined third cylinder so that the nut 50 can slide smoothly along the surface 54.

As shown in FIGS. 7A and 7B, the cross section of the clamp member 44 between the surfaces 46 and 54 is substantially crescent-shaped. As the clamp member 44 is rotated about the central axis of the surface 54, this varies the thickness of the clamp member 44 along the bolt 48. Thus, as viewed in FIGS. 7A and 7B, when the clamp member 44 is rotated clockwise, this thickness is decreased and the projections 34 and 36 are allowed to separate, as shown in FIG. 7B, thereby loosening the adjustment ring 26. When the clamp member 44 is rotated counterclockwise, the thickness of the clamp member 44 along the bolt 48 is increased, as shown in FIG. 7A, causing the projections 34 and 36 to be pressed together so as to narrow the gap therebetween and clamp the adjustment ring 26 to the motor housing 12 and the base 20. The clamp member 44 is formed with a handle portion 62 to provide sufficient leverage for proper operation. Such a clamp member 44 operates as a lever and provides a quick release/engagement of the adjustment ring clamping function.

By utilizing a threaded bolt 48 and a threaded nut 50 to hold the projections 34 , 36 and the clamp member 44, adjustability of the loosening and tightening of the adjustment ring 26 is provided.

Accordingly, there has been disclosed an improved arrangement for clamping a split depth of cut adjustment ring on a router. While an exemplary embodiment has been disclosed herein, it will be appreciated by those skilled in the art that various modifications and adaptations to the disclosed embodiment may be made and it is only intended that this invention be limited by the scope of the appended claims.

I claim:

1. In a router including a motor housing having an external cylindrical portion, said cylindrical portion having a first longitudinal region with a substantially smooth surface and a second longitudinal region having an external screw thread, a base having a cylindrical bore for slidably receiving therein said first longitudinal region of said motor housing cylindrical portion, and an adjustment ring including means for engaging said screw thread on said motor housing and means for rotationally engaging said base, said adjustment ring being split with an opening between two opposed ends;

clamp means for releasably securing said adjustment ring to said motor housing and said base so as to maintain the position of said base relative said motor housing, comprising:

a first projection formed on said adjustment ring adjacent a first one of said opposed ends and extending substantially radially outwardly from said adjustment ring, said first projection being formed with a first through-bore extending substantially parallel to a tangent to said adjustment ring at said first opposed end;

a second projection formed on said adjustment ring adjacent the second one of said opposed ends and extending substantially radially outwardly from said adjustment ring, said second projection being formed with a second through-bore extending substantially parallel to a tangent to said adjustment ring at said second opposed end, said second through-bore being substantially aligned with said first through-bore when said opposed ends are closely adjacent each other;

a first camming surface on said first projection facing away from said second projection;

a clamp member having a second camming surface slidably engaging said first camming surface; and holding means extending through said first and second through-bores for engaging said clamp member and holding said first projection between said second projection and said clamp member so that movement of said clamp member in a first direction draws said first and second projections toward each other and movement of said clamp member in a second direction allows said first and second projections to separate;

whereby movement of said clamp member may be effected by an operator for selectively securing and releasing said adjustment ring with respect to said motor housing and said base.

2. The clamp means according to Claim 1 wherein said first camming surface is complemental to a segment of the surface of a first cylinder having a central axis extending substantially radial to said adjustment ring, said clamp member is arranged for rotary motion about a first axis substantially radial to said adjustment ring, and said second camming surface includes a segment of the surface of a second cylinder having a central axis parallel to and spaced from said first axis, said first and second cylinders having substantially equal radii.

3. The clamp means according to claim 2 wherein:

said clamp member is formed with a third surface which is complemental to a segment of the surface of a third cylinder having a central axis co-linear with said first axis; and said holding means includes:

a rod extending through said first and second through-bores;

a stop member mounted to a first end of said rod, said stop member having a dimension larger than said second through-bore so that said stop member cannot pass through said second through-bore, said stop member being located on a side of said second projection opposite said first projection; and a slide member mounted to the second end of said rod and having a surface slidedly engaged with said third surface of said clamp member, said slide member surface being a segment of said third cylinder surface.

4. The clamp means according to claim 3 further including means for adjusting the distance between said stop member and said slide member of said holding means.

5. The clamp means according to claim 4 wherein said rod is formed with external screw threads at its second end and said slide member includes a nut engaging said screw threads.

6. The clamp means according to claim 3 wherein said clamp member is formed with an elongated opening extending between said clamp member second camming surface and said clamp member third surface, said rod extends through said clamp member elongated opening, and said slide member is dimensioned so that it cannot pass through said clamp member elongated opening.

* * * * *